United States Patent Office 3,595,837
Patented July 27, 1971

3,595,837
THERMOPLASTIC POLYESTER MOLDING COMPOSITIONS CONTAINING SILICON SPIRANES
Walter Herwig and Ludwig Brinkmann, Frankfurt am Main, Germany, assignors to Farbwerke Hoechst Aktiengesellschaft vormals Meister Lucius & Bruning, Frankfurt am Main, Germany
No Drawing. Filed Jan. 31, 1969, Ser. No. 795,724
Claims priority, application Germany, Feb. 9, 1968,
P 16 94 243.1
Int. Cl. C08g *39/04*
U.S. Cl. 260—75
10 Claims

ABSTRACT OF THE DISCLOSURE

Molding compositions from linear saturated polyesters and silicon spiranes, which may be shaped in the thermoplastic state and from which injection-molded pieces can be made which do not exhibit flash formation.

---

The present invention relates to thermoplastic molding compositions containing polyesters.

It has been proposed that polyesters from aromatic dicarboxylic acids and aliphatic or cycloaliphatic diols may be worked up into crystallized molded pieces by injection molding. These molded pieces are especially important for industrial uses as high-quality products, for example, for cog-wheels, trunnion bearings or disk cams. Such products have to meet high standards not only with regard to their mechanical properties, but they should also have, for example, an especially good surface quality, fill the mold completely, possess dimensional accuracy and show no flash formation. The external quality of the molded piece may be manipulated in various different ways, by the addition of lubricants or by variably adjusting the spraying conditions of the mold. In spite of these variants, the avoidance of flash formation is an unsolved problem in the injection-molding of polyethylene terephthalate. The usual method employed in injection-molding, viz. to regulate the dwell-time in such a manner that the mold is filled completely but that the molded piece remains free from flash formation is not successful. In the case of a complete mold charge it is, therefore, necessary in most cases to subject the piece that has been removed from the mold to a mechanical after-treatment.

Now we have found that a thermoplastic molding composition comprising (a) a linear saturated polyester of an aromatic dicarboxylic acid and, optionally, a small quantity of an aliphatic dicarboxylic acid with a saturated aliphatic or cycloaliphatic diol;

(b) from 0.02% to 2% by weight, preferably from 0.03% to 0.7% by weight, calculated on the polyester, of 3,3,9,9-tetraalkyl-2,4,8,10-tetroxa-3,9-disilaspiro[5,5]-undecane of the formula

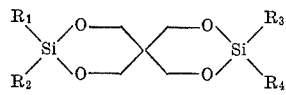

and/or 3,3,12,12-tetraalkyl-2,4,11,13-tetroxa-3,12-disiladispiro-[5,2,5,2]-hexadecane of the formula

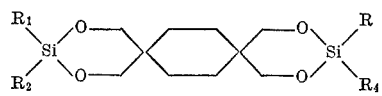

wherein $R_1$, $R_2$, $R_3$ and $R_4$ each represent an aliphatic hydrocarbon radical containing up to 6 carbon atoms, for example a methyl, ethyl, isopropyl, n-propyl, n-hexyl or a benzyl group, possesses outstanding properties.

The silicon compounds to be used according to the invention may be obtained, for example, by reacting diacetoxy dimethyl silane with pentaerythrite or 1,1,4,4-tetramethylol-cyclohexane, distilling off acetic acid and purifying the spiranes formed by distillation or recrystallization.

It is surprising that the molding compositions composed in the aforesaid manner do not exhibit flash formation on being worked up into injection-molded pieces. An additional noteworthy effect is that the added silicon spiranes promote crystallization so that an additional inorganic nucleation may possibly be dispensed with.

Polyethylene terephthalate is preferably used as polyester. However, there may alternatively be used other polyesters, for example polycyclohexane-1,4-dimethylol terephthalate or a polyester containing, as acid component, units of terephthalic acid and up to 5 mol percent of units of one or more other aromatic or aliphatic dicarboxylic acids, for example isophthalic acid, naphthalene-2-6-dicarboxylic acid, or adipic acid, and/or, as alcoholic component, units of ethylene glycol and up to 30 mol percent of one or more other aliphatic diols, for example, 2,2-dimethyl-propanediol-1,3 or butanediol-1,4. Alternatively, the polyesters may contain units of hydroxycarboxylic acids.

The polyesters preferably have a reduced viscosity of from 0.6 to 2.0 dl./g., more advantageously a reduced viscosity of 0.9 to 1.6 dl./g., measured in a 1% solution in a 60:40 by weight mixture of phenol and tetrachloroethane at 25° C. Especially suitable are polyesters having a reduced specific viscosity of from 1.1 to 1.5 dl./g.

After the termination of the polycondensation, the silicon spirane may be applied to the ground or granulated polyester in a suitable form, for example in the form of a powder or a molten mass, by simple rolling in a suitable vessel. However, the spirane may also be dissolved in a solvent, the solution may be sprayed onto the polyester granules and the solvent may be removed in vacuo or at an elevated temperature. Prior to the work-up, it is advantageous to fuse the powder or the granular product, whose surface has been coated with the silicon compound, in an extruder and then to granulate it in order to obtain an especially homogeneous mixture of the components. Another possibility is to add the silicon compound already during the melt condensation.

When an inorganic nucleating agent is added to the polyester, for example a silicate such as kaolin or talcum, or an alkaline earth metal carbonate, it may be added to the polyester during the condensation or the finished granules may be subjected to rotation together with the nucleating agent. This nucleating agent may be incorporated prior to, simultaneously with or after the addition of the silicon compound.

In order to obtain good quality injection-molded pieces, the polyester molding composition should contain as little moisture as possible, preferably not more than 0.01 percent by weight. When a rapid crystallization in the mold and, thereby, a short molding period is to be attained, the mold should be heated at a temperature of at least 110° C. Molding temperatures within the range of from 120° C. to 150° C. are preferred.

The following examples serve to illustrate the invention, but they are not intended to limit it thereto, the parts being by weight:

EXAMPLE 1

Ground polyetheylene glycol terephthalate having a relative specific viscosity of 1.59 dl/g. was treated as follows:

(A) 1000 parts of polyethylene glycol terephthalate powder were subjected for one hour to rotation together with 3 parts of 3,3,9,9-tetramethyl-2,4,8,10-tetroxa-3,9-disilaspiro[5,5]-undecane. The polyethylene glycol terephthalate coated in this manner was homogenized at a temperature of 275° C. in an extruder (residence time in the cylinder: 1.5 minutes/36 r.p.m. (screw)), and then granulated.

(B) 1000 parts of polyethylene glycol terephthalate powder were subjected for one hour to rotation together with 4 parts of talcum. The work-up was carried out as described under (A).

(C) 1000 parts of polyethylene glycol terephthalate powder were subjected for one hour to rotation together with 3 parts of 3,3,9,9-tetramethyl-2,4,8,10-tetroxa-3,9-disilaspiro[5,5]-undecane and 4 parts of talcum. The work-up was carried out as described under (A).

The granules obtained as described under (A), (B) and (C) were dried and injection-molded into sheets of dimensions 60 x 60 x 2 mm. The following values were maintained constant: the cylinder temperatures at 270° C./260° C./260° C., the temperature of the mold at 140° C., the injection time at 15 seconds and the injection pressure at 140 atmospheres gage while the dwell-time and the residence time in the mold were varied. The results are shown in the table following hereunder.

| Specific visicosity prior to injection-molding | Specific viscosity after injection-molding | Densities at different residence times in the mold | | Mold charge and flash variable dwell-time (atmospheres gage) | | |
|---|---|---|---|---|---|---|
| | | Seconds | Density | Dwell-time | Mold charge[1] | Flash[2] |
| A 1.15 | 1.02 | 15 | 1.362 | 40 | MC− | − |
| | | 30 | 1.367 | 70 | MC+ | − |
| | | 45 | 1.365 | 90 | MC+ | − |
| | | 60 | 1.368 | 120 | MC+ | − |
| | | | | 140 | MC+ | − |
| B 1.19 | 1.10 | 15 | 1.369 | 40 | MC+ | + |
| | | 30 | 1.370 | 70 | MC+ | + |
| | | 45 | 1.372 | 90 | MC+ | ++ |
| | | 60 | 1.372 | | | |
| C 1.14 | 1.05 | 15 | 1.370 | 40 | MC− | − |
| | | 30 | 1.370 | 70 | MC+ | − |
| | | 45 | 1.371 | 90 | MC+ | − |
| | | 60 | 1.373 | 120 | MC+ | − |
| | | | | 140 | MC+ | − |

[1] Complete mold charge: MC+; incomplete mold charge: MC−.
[2] Flash exceeding 4 mm: ++; Flash 1 to 2 mm: +; No flash: −.

EXAMPLE 2

The process was carried out as described in Example 1(A) with the exception, however, that the amounts of silicon compound added were varied. The table following hereunder indicates mold charge and flash.

| Percent by weight Si-spirane | Mold charge and flash | | |
|---|---|---|---|
| | Dwell time | Mold charge (1) | Flash (2) |
| 0.1 | 40 | MC+ | − |
| | 90 | MC+ | − |
| | 140 | MC+ | − |
| 0.05 | 40 | MC+ | − |
| | 90 | MC+ | − |
| | 140 | MC+ | + |

We claim:
1. A thermoplastic molding composition consisting essentially of a mixture of
(a) a linear saturated polyester of polyethylene terephthalate or polycyclohexane-1,4 dimethylol terephthalate or polyethylene terephthalate which contains as additional alcohol component up to 30 mole percent of 2,2-dimethyl-propane-diol-(1,3) or butane-diol-

(1,4) or any of the above polyesters which contains as additional acid component up to 5 mole percent of isophthalic acid, naphthalene - 2,6 - dicarboxylic acid or adipic acid, and
(b) from 0.02% to 2% by weight calculated on the polyester, of 3,3,9,9-tetraalkyl-2,4,8,10-tetroxa-3,9-disilaspiro[5,5]-undecane of the formula

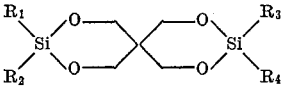

and/or 3,3,12,12-tetraalkyl - 2,4,11,13 - tetroxa-3,12-disiladispiro-[5,2,5,2]-hexadecane of the formula

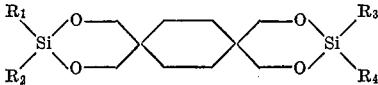

wherein $R_1$, $R_2$, $R_3$ and $R_4$ each represent an aliphatic hydrocarbon radical containing up to 6 carbon atoms or a benzyl group.

2. A thermoplastic molding composition as claimed in claim 1, wherein the linear saturated polyester is polyethyleneglycol terephthalate.

3. A thermoplastic molding composition as claimed in claim 1, wherein the polyester is polycyclohexane-1,4-dimethylol terephthalate.

4. A thermoplastic molding composition as claimed in claim 1, wherein, as units of one or more other aromatic or aliphatic dicarboxylic acids, compounds selected from the group consisting of isophthalic acid, naphthalene-2,6-dicarboxylic acid or adipic acid are used.

5. A thermoplastic molding composition as claimed in claim 1, wherein, as other aliphatic diols, compounds selected from the group consisting of 2,2-dimethylpropanediol-1,3-or butanediol-1,4 are used.

6. A thermoplastic molding composition as claimed in claim 1, wherein the linear saturated polyester has a reduced specific viscosity within the range of from 0.6 to 2.0 dl/g., measured in a 1% solution in a 60:40 by weight mixture of phenol and tetrachloroethane at 25° C.

7. A thermoplastic molding composition as claimed in claim 1, wherein the linear saturated polyester has a reduced specific viscosity within the range of from 0.9 to 1.6 dl/g., measured in a 1% solution in a 60:40 by weight mixture of phenol and tetrachloroethane at 25° C.

8. A thermoplastic molding composition as claimed in claim 1, wherein the linear saturated polyester has a reduced specific viscosity within the range of from 1.1 to 1.5 dl/g.

9. A thermoplastic molding composition as claimed in claim 1, wherein, in addition to silicon spirane, as an inorganic nucleating agent kaolin, talcum or an alkaline earth metal carbonate is added to the linear saturated polyester.

10. The thermoplastic molding composition as defined in claim 1 and wherein the silicon spirane is added in an amount from 0.03% to 0.7% by weight calculated on the amount of polyester in the molding composition.

References Cited

UNITED STATES PATENTS 3,428,707   2/1969   Amos et al. _____ 260—827

MELVIN GOLDSTEIN, Primary Examiner

U.S. Cl. X.R.

260—29.1; 264—328